United States Patent
Kim et al.

(10) Patent No.: US 8,895,176 B2
(45) Date of Patent: Nov. 25, 2014

(54) LITHIUM RECHARGEABLE BATTERY MODULE

(71) Applicant: Samsung SDI Co., Ltd., Yongin-si (KR)

(72) Inventors: Young-Kee Kim, Yongin-si (KR); Jin-Man Jeoung, Yongin-si (KR); Eui-Hwan Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/794,554

(22) Filed: Mar. 11, 2013

(65) Prior Publication Data

US 2013/0288107 A1 Oct. 31, 2013

(30) Foreign Application Priority Data

Apr. 30, 2012 (KR) .................. 10-2012-0045557

(51) Int. Cl.
*H01M 4/13* (2010.01)
*H01M 2/20* (2006.01)

(52) U.S. Cl.
CPC ............... *H01M 2/206* (2013.01); *H01M 4/13* (2013.01); *Y02E 60/122* (2013.01)
USPC .......................................... 429/158; 429/156

(58) Field of Classification Search
None
See application file for complete search history.

(56) References Cited

U.S. PATENT DOCUMENTS

| | | | | |
|---|---|---|---|---|
| 5,537,390 A | * | 7/1996 | Horiba et al. | 320/134 |
| 2001/0052758 A1 | * | 12/2001 | Odaohhara | 320/103 |
| 2002/0037451 A1 | * | 3/2002 | Eguchi et al. | 429/213 |
| 2008/0084180 A1 | * | 4/2008 | Hasegawa | 320/112 |
| 2008/0241666 A1 | * | 10/2008 | Baba et al. | 429/158 |
| 2010/0072827 A1 | * | 3/2010 | Norstrom | 307/112 |
| 2010/0190081 A1 | * | 7/2010 | Park et al. | 429/452 |
| 2010/0207577 A1 | | 8/2010 | Sugiyama et al. | |
| 2011/0309798 A1 | | 12/2011 | Hara et al. | |

FOREIGN PATENT DOCUMENTS

| | | |
|---|---|---|
| JP | 2009-129644 A | 6/2009 |
| JP | 2009-227171 A | 10/2009 |
| JP | 2011-18537 A | 1/2011 |
| KR | 10-2006-0032813 | 4/2006 |
| KR | 10-2008-0073220 | 8/2008 |
| KR | 10-2010-0061714 | 6/2010 |

* cited by examiner

*Primary Examiner* — Patrick Ryan
*Assistant Examiner* — Haixia Zhang
(74) *Attorney, Agent, or Firm* — Christie, Parker & Hale, LLP (57) ABSTRACT

A rechargeable lithium battery module includes a first rechargeable lithium battery cell combined with a second rechargeable lithium battery cell, the first rechargeable lithium battery cell being the same or different than the second rechargeable lithium battery cell, and the rechargeable lithium battery module has an output voltage of about 13.6 V to about 15.6 V.

13 Claims, 3 Drawing Sheets

LITHIUM RECHARGEABLE BATTERY MODULE

CROSS-REFERENCE TO RELATED APPLICATION

This application claims priority to and the benefit of Korean Patent Application No. 10-2012-0045557 filed in the Korean Intellectual Property Office on Apr. 30, 2012, the entire contents of which are incorporated herein by reference.

BACKGROUND

1. Field

This disclosure relates to a rechargeable lithium battery module.

2. Description of the Related Art

An automobile is provided with an Integrated Starter and Generator (ISG) functioning as a starter for starting the engine and as a power generator to improve fuel efficiency of the automobile. The ISG stops the engine when the engine runs idle for a predetermined or set time, and when the brake pedal is released or when the accelerator pedal is pressed, an Idle Stop & Go function, which restarts the engine, is performed.

Lead acid batteries can be used in rechargeable battery modules for supplying power to the ISG. Lead acid batteries, however, have relatively low energy density and high capacity-based volume, and when lead acid batteries are connected with the ISG, the cycle-life of lead acid batteries is reduced as a result of repeated charging and discharging. Also, lead acid batteries have poor low-temperature starting characteristics and take a relatively long time to be charged. Therefore, it is desirable to develop a rechargeable battery module having a small volume, good low-temperature discharge characteristics, rapid charge characteristics and good cycle-life characteristics while supplying voltage in the driving voltage region of the ISG.

SUMMARY

Aspects of embodiments of the present invention provide a rechargeable lithium battery module having a small volume, good or improved low-temperature discharge characteristics, rapid charge characteristics and good or improved cycle-life characteristics while supplying voltage in the driving voltage region of an ISG.

In an embodiment of the present invention, a rechargeable lithium battery module includes a first rechargeable lithium battery cell combined with a second rechargeable lithium battery cell, the first rechargeable lithium battery cell including a positive electrode including a first positive active material and a first negative electrode including a first negative active material; and the second rechargeable lithium battery cell including a positive electrode including the first positive active material and a negative electrode including the first negative active material, or a positive electrode including a second positive active material or a negative electrode including a second negative active material, wherein the second positive active material is different from the first positive active material and wherein the second negative active material is different from the first negative active material, and wherein the rechargeable lithium battery module has an output voltage of about 13.6 V to about 15.6 V.

The first positive active material and the second positive active material may be individually selected from lithium-cobalt-based oxide, lithium-nickel-cobalt-manganese-based oxide, lithium-nickel-cobalt-aluminum-based oxide, lithium-iron-phosphate-based oxide, lithium-manganese-based oxide, lithium-titanium-based oxide, or combinations thereof.

The positive active material may have at least one structure selected from a layered structure, a spinel-based structure, or an olivine-based structure.

The first positive active material may further include activated carbon.

The first negative active material may include at least one carbon-based material selected from a crystalline carbon-based material or an amorphous carbon-based material. The crystalline carbon-based material may be graphite. The amorphous carbon-based material may be soft carbon.

The first positive active material may include at least one material selected from lithium-cobalt-based oxide or lithium iron phosphate-based oxide, and the first negative active material may include soft carbon.

The four rechargeable lithium battery cells of the rechargeable lithium battery cells may be connected in series in the lithium battery module.

A diode may be electrically connected to an end of an outermost cell of one of the rechargeable lithium battery cells.

Four rechargeable lithium battery cells may be connected in series to form a main rechargeable battery, and an auxiliary rechargeable battery including at least one rechargeable lithium battery cell may be connected to the main rechargeable battery in parallel. The auxiliary rechargeable battery may have rechargeable lithium battery cells that are the same as the main rechargeable battery. The rechargeable lithium battery module may further include a resistor electrically connected with the auxiliary rechargeable battery in series.

The rechargeable lithium battery module may be a rechargeable lithium battery module for an integrated starter and generator.

DETAILED DESCRIPTION

This invention will be described more fully hereinafter with reference to the accompanying drawings, in which exemplary embodiments of the present invention are shown. This invention may, however, be embodied in many different forms and should not be construed as limited to the exemplary embodiments set forth herein.

Figure 1:
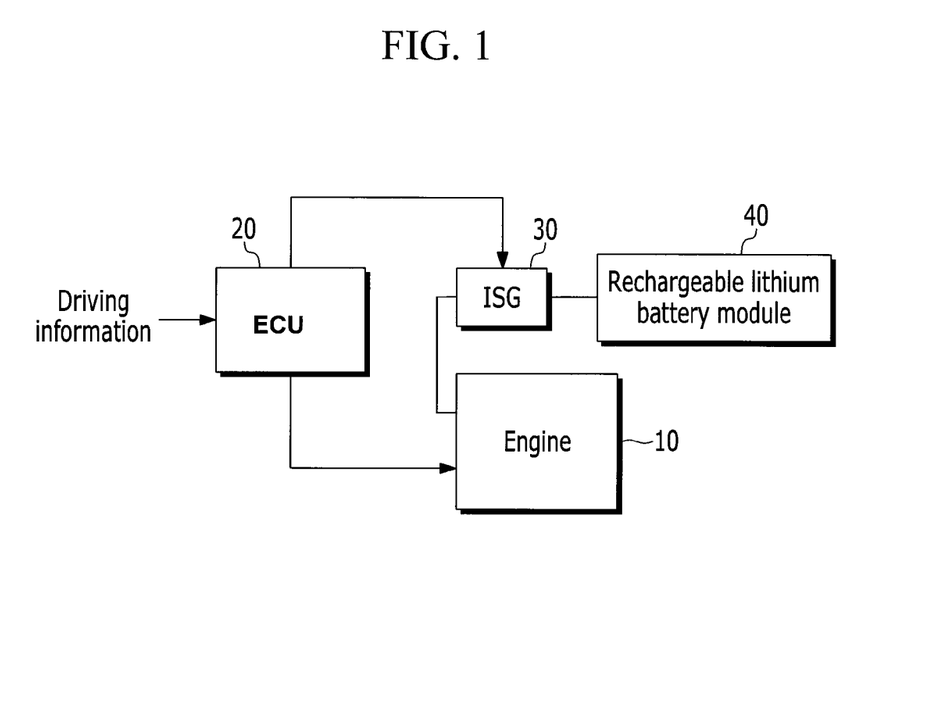
FIG. 1 is a schematic block diagram of an ISG for an automobile and a rechargeable lithium battery module.

FIG. 1 is a schematic block diagram of an ISG (Integrated Starter & Generator) for an automobile and a rechargeable lithium battery module.

Referring to FIG. 1, an engine 10 of an automobile is connected to an electronic control unit 20 and driven under the control of the electronic control unit 20. An ISG 30 functioning as a starter for starting the engine 10 and a generator for generating power is connected to the engine 10.

The electronic control unit 20 receives driving information (e.g., driving speed, operation of the transmission, operation of the brake, or the like), analyzes the received driving information, and controls the engine 10 to stop running when idle and to restart. Therefore, when the engine 10 continues to run idle for a predetermined or set time, the engine 10 stops, and when a brake pedal is released or an accelerator pedal is pressed, an idle stop and go function, which restarts the engine 10 using the ISG 30, is performed.

The driving voltage of the ISG ranges from about 13.6 V to about 15.6 V.

A rechargeable lithium battery module 40 according to one embodiment includes the same or different rechargeable lithium battery cells combined with each other, and the rechargeable lithium battery module 40 satisfies a driving voltage condition of about 13.6 V to about 15.6 V, that is, the driving voltage region of the ISG 30.

Herein, 'combined with' includes a series structure or a combination of a series structure and a parallel structure. Also, 'the same' means that the material and composition of the positive active material and the negative active material that are used in the rechargeable lithium battery cell are the same (e.g., the positive active material and the negative active material in the rechargeable lithium battery cell are the same as the positive active material and negative active material in one or more rechargeable lithium battery cells in the module), and 'different' means that at least one of the positive active material and the negative active material of the rechargeable lithium battery cell is different (e.g., the positive active material and the negative active material in the rechargeable lithium battery cell is different from the positive active material and negative active material in one or more rechargeable lithium battery cells in the module).

In one embodiment of the present invention, a first rechargeable lithium battery cell includes a positive electrode including a positive active material and a negative electrode including a negative active material. The same rechargeable lithium battery cells include the same positive active material and negative active material as the positive active material and negative active material in the first rechargeable lithium battery cells in the module. The different rechargeable lithium battery cells include at least one of the positive active material and the negative active material different from the positive active material and negative active material in the first rechargeable lithium battery cell.

The rechargeable lithium battery may be classified as a lithium ion battery, lithium ion polymer battery, or lithium polymer battery according to the presence of a separator and the kind of electrolyte used in the battery. The rechargeable lithium battery may be also classified as a cylindrical, prismatic, coin-type, or pouch battery according to its shape, and classified as a bulk type or thin film type according to its size. Structures and fabrication methods of lithium ion batteries are well known in the art.

Figure 5:
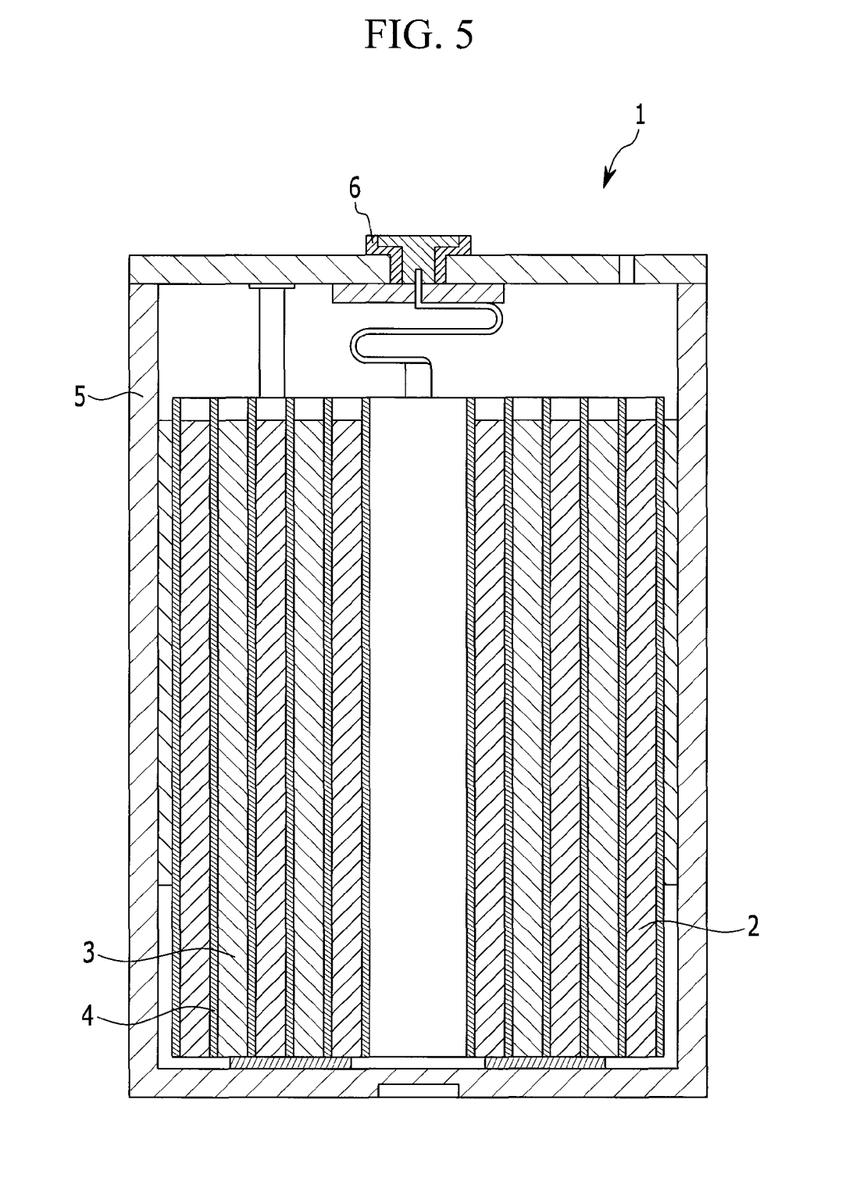
FIG. 5 is a schematic view of a rechargeable lithium battery according to one embodiment.

FIG. 5 is a schematic view of a rechargeable lithium battery according to one embodiment. Referring to FIG. 5, the rechargeable lithium battery 1 is a cylindrical battery that includes a negative electrode 2, a positive electrode 3, a separator 4 disposed between the negative electrode 2 and positive electrode 3, an electrolyte (not shown) impregnated in the negative electrode 2, positive electrode 3, and separator 4, a battery case 5, and a sealing member 6 sealing the battery case 5. The rechargeable lithium battery 1 is fabricated by sequentially stacking a negative electrode 2, a positive electrode 3, and a separator 4, spiral-winding them, (e.g., spiral winding the negative electrode 2, the positive electrode 3 and separator 4), and housing the wound product in the battery case 5.

The positive electrode includes a current collector and a positive active material layer disposed on the current collector. The positive active material layer includes a positive active material.

The positive active material may include at least one material selected from lithium-cobalt-based oxide, lithium-nickel-cobalt-manganese-based oxide, lithium-nickel-cobalt-aluminum-based oxide, lithium-iron-phosphate-based oxide, lithium-manganese-based oxide, and lithium-titanium-based oxide.

The positive active material may have at least one structure selected from a layered structure, a spinel-based structure, and an olivine-based structure.

The positive active material may include a compound represented by the following formulae: $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$, and $0 \leq c \leq 0.05$); $LiE_{2-b}R_bO_{4-c}D_c$ ($0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$, and $0 < \alpha < 2$); $Li_aNi_bE_cG_dO_2$ ($0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); or $LiFePO_4$.

In the above chemical formulae, A is selected from Ni, Co, Mn, or a combination thereof; R is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; Z is selected from F, S, P, or a combination thereof; G is selected from Al, Cr, Mn, Fe, Mg, La, Ce, Sr, V, or a combination thereof; Q is selected from Ti, Mo, Mn, or a combination thereof; T is selected from Cr, V, Fe, Sc, Y, or a combination thereof; J is selected from V, Cr, Mn, Co, Ni, Cu, or a combination thereof.

The positive active material compound may have a coating layer on its surface, or may be mixed with another compound having a coating layer. The coating layer may include at least one coating element or at least one compound selected from an oxide of a coating element, a hydroxide of a coating element, an oxyhydroxide of a coating element, an oxycarbonate of a coating element, and a hydroxyl carbonate of a coating element. The coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed using any method having no adverse influence on the properties of the positive active material. For example, the method may include any coating method such as spray coating, dipping, or the like, as known to those of skill in the art.

In one embodiment of the present invention, the positive active material may further include activated carbon. The activated carbon improves charge and discharge characteristics without decreasing the relative capacity, and allows for the impregnation of an electrolyte inside the electrode to actively transfer lithium ions.

The positive active material layer includes a binder and a conductive material.

The binder improves the binding properties of the positive active material particles to each other and to the current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material improves the conductivity of the electrode. Any electrically conductive material may be used as a conductive material unless it causes (e.g., its use would result in) a chemical change. Examples of the conductive material may include a carbon-based material such as natural graphite, artificial graphite, carbon black, acetylene black, Ketjen black, carbon fiber, carbon nanotubes, or the like; a metal-based material such as metal powder, metal fiber of copper, nickel, aluminum, silver, or the like; a conductive polymer material such as a polyphenylene derivative; and mixtures thereof.

The current collector may include Al, but it is not limited thereto.

The negative electrode includes a current collector and a negative active material layer disposed on the current collector, and the negative active material layer includes a negative active material.

In one embodiment of the present invention, the negative active material may include at least one carbon-based material selected from a crystalline carbon-based material or an amorphous carbon-based material.

The crystalline carbon-based material may include non-shaped, sheet, flake, spherical, or fiber shaped natural graphite or artificial graphite.

The amorphous carbon-based material may be a soft carbon, a hard carbon, a mesophase pitch carbonization product, fired coke, or the like. In one embodiment, the soft carbon is preferable. Soft carbon is low crystalline carbon material may be converted into graphite.

The negative active material layer may include a binder, and optionally a conductive material.

The binder adheres the negative active material particles with one another and with the current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material is used to improve the conductivity of the electrode. Any electrically conductive material may be used as a conductive material unless it causes (e.g., its use would result in) a chemical change. Examples of conductive material include a carbon-based material such as natural graphite, artificial graphite, carbon black, acetylene black, Ketjen black, carbon fiber, carbon nanotubes, or the like; a metal-based material such as a metal powder or a metal fiber including copper, nickel, aluminum, silver, or the like; a conductive polymer such as a polyphenylene derivative; and a mixture thereof.

The current collector may include a copper foil, a nickel foil, a stainless steel foil, a titanium foil, a nickel foam, a copper foam, a polymer substrate coated with a conductive metal, or combinations thereof, but the current collector is not limited thereto.

In one embodiment of the present invention, the positive active material includes at least one material selected from lithium-cobalt-based oxide and lithium iron phosphate-based oxide, and the negative active material includes soft carbon.

Each electrode may be fabricated by mixing an active material, a conductive material, and a binder in a solvent to prepare an active material composition, and coating the composition on a current collector. Electrode fabricating methods are known to those of skill in the art. The solvent may be N-methylpyrrolidone, but it is not limited thereto.

The electrolyte includes a lithium salt and a non-aqueous organic solvent.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like. Examples of the ketone-based solvent include cyclohexanone, and the like. Examples of the alcohol-based solvent include ethyl alcohol, isopropyl alcohol, and the like. Examples of the aprotic solvent include nitriles such as R—CN (where R is a C2 to C20 linear, branched, or cyclic hydrocarbon, that optionally includes a double bond, an aromatic ring, or an ether bond), amides such as dimethylformamide, dioxolanes such as 1,3-dioxolane, sulfolanes, and the like.

The non-aqueous organic solvent may be a single compound or a mixture. When the organic solvent is a mixture, the mixture ratio can be controlled in accordance with the desired battery performance.

A carbonate-based solvent may include a mixture of a cyclic carbonate and linear carbonate. The cyclic carbonate and the linear carbonate are mixed together in the volume ratio of about 1:1 to about 1:9, which enhances performance of the electrolyte.

The non-aqueous organic solvent may further include an aromatic hydrocarbon-based organic solvent as well as the carbonate-based solvent. The carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound represented by the following Chemical Formula 1.

[Chemical Formula 1]

In Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 2 in order to improve cycle-life of a battery.

[Chemical Formula 2]

In Chemical Formula 2, $R_7$ and $R_8$ are each independently hydrogen, a halogen, a cyano group (CN), a nitro group ($NO_2$), or a C1 to C5 fluoroalkyl group, provided that at least one of $R_7$ or $R_8$ is a halogen, a cyano group (CN), a nitro group ($NO_2$), or a C1 to C5 fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like.

When the vinylene carbonate or the ethylene carbonate-based compound is used, their amounts may be controlled to improve cycle-life.

The lithium salt dissolved in the organic solvent supplies lithium ions in the battery and improves lithium ion transport between positive and negative electrodes. Examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato)borate; LiBOB), and a combination thereof. The lithium salt may be used at a concentration of about 0.1 to about 2.0 M. When the lithium salt is included at the above concentration range, electrolyte performance and lithium ion mobility may be enhanced due to optimal electrolyte conductivity and viscosity.

The separator 4 separates the negative electrode 2 from the positive electrode 3 and provides a passage for lithium ions. The separator may have low resistance for ion movement in an electrolyte but good electrolyte solution absorbing capability. For example, the separator may be selected from glass fiber, polyester, TEFLON (tetrafluoroethylene), polyethylene, polypropylene, polytetrafluoroethylene (PTFE), and a combination thereof and may be a non-woven fabric or a cloth. For example, a lithium ion battery may include a polyolefin-based polymer separator such as polyethylene, polypropylene, or the like. The separator may be coated with a ceramic component or a polymer material to provide heat resistance or mechanical strength and the separator may have optionally a single layer or multiple layers.

The following Table 1 shows the charge voltage and output voltage of a rechargeable lithium battery according to selected positive active materials and negative active materials.

TABLE 1

| Positive active material | Negative active material | Charge voltage [V] | Output voltage [V] |
|---|---|---|---|
| Lithium-cobalt-based oxide | graphite | 4.2 | 3.8 |
|  | soft carbon | 4.2 | 3.8 |
| Lithium-nickel-cobalt-aluminum-based oxide | graphite | 4.2 | 3.5 |
|  | soft carbon | 4.2 | 3.5 |
| Lithium-nickel-cobalt-manganese-based oxide | graphite | 4.2 | 3.5 |
|  | soft carbon | 4.2 | 3.5 |
| Lithium iron phosphate-based oxide | graphite | 3.8 | 3.4 |
|  | soft carbon | 3.8 | 3.4 |
| Lithium-manganese-based oxide | graphite | 4.2 | 4.0 |
|  | soft carbon | 4.2 | 4.0 |

According to one embodiment of this disclosure, the output voltage of about 13.6 to about 15.6V, which is the ISG driving voltage, may be satisfied by properly combining rechargeable lithium battery cells.

An example of a combination of lithium rechargeable lithium battery cells is hereinafter described. A rechargeable lithium battery cell will be referred to as a 'battery cell' for convenience.

Figure 2:
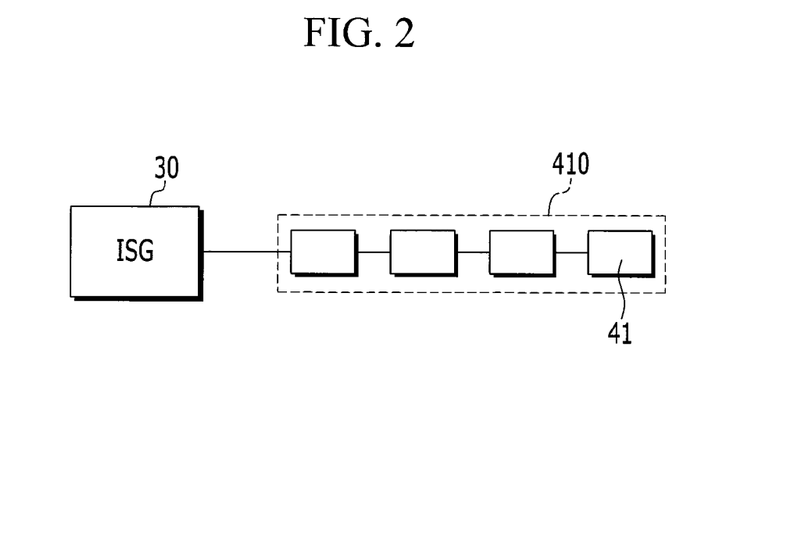
FIG. 2 is a schematic block diagram of a rechargeable lithium battery module according to one embodiment.

FIG. 2 is a schematic block diagram of a rechargeable lithium battery module according to one embodiment.

Referring to FIG. 2, a rechargeable battery module 410 is formed by connecting four rechargeable lithium battery cells 41 in series. The output voltage of the rechargeable lithium battery cells 41 fall in the range of about 3.4 V to about 4.0 V. The same or different rechargeable lithium battery cells 41 are selected such that the driving voltage region of the ISG, which ranges from about 13.6 to about 15.6 V, is provided by connecting the selected rechargeable lithium battery cells 41 in series.

For example, a rechargeable battery module 410 could be fabricated by connecting four battery cells 41 having an LFP (Lithium Ion phosphate-based oxide) positive active material and a soft carbon negative active material in series. The module has an output voltage of about 13.6 V.

Another rechargeable battery module 410 could be fabricated by connecting four battery cells 41 having an LCO (Lithium-cobalt-based oxide, e.g. $LiCoO_2$) positive active material and a soft carbon negative active material in series. The module has an output voltage of about 15.2 V.

Another rechargeable battery module 410 could be fabricated by connecting two battery cells 41 having an LFP (e.g. LiFePO$_4$), positive active material and a soft carbon negative active material and two battery cells 41 having an LCO positive active material and a soft carbon negative active material in series. The module has an output voltage of about 14.4 V.

As described above, a rechargeable battery module 410 satisfying a driving voltage range of about 13.6 to about 15.6 V may be fabricated by combining the same or different battery cells 41.

Figure 3:
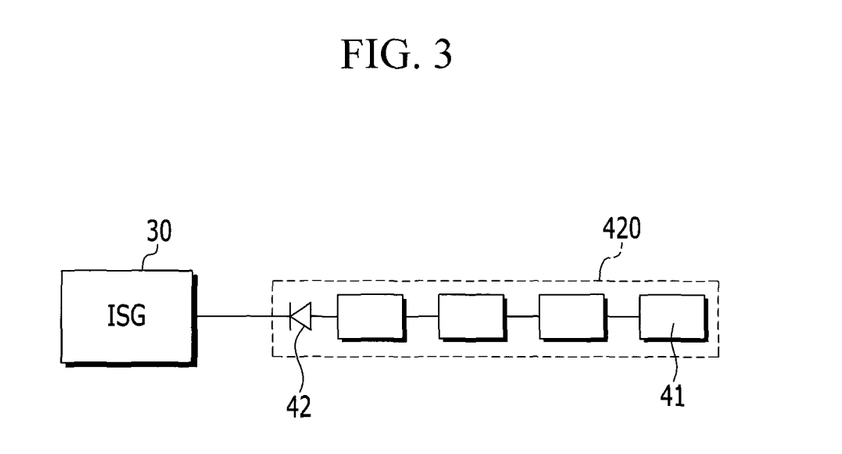
FIG. 3 is a schematic block diagram of a rechargeable lithium battery module according to another embodiment.

FIG. 3 is a schematic block diagram of a rechargeable lithium battery module according to another embodiment.

Referring to FIG. 3, a rechargeable battery module 420 includes four battery cells 41 that are connected in series, and a diode 42 disposed in the forward direction of the discharge current from a terminal of the outermost battery cell 41. That is, the diode 42 is at an end of the series of batteries between the batteries and the ISG 30. In one embodiment, the diode may be included in the battery cell or the rechargeable battery module.

The diode 42 makes the current flow smoothly at a voltage level higher than or equal to a predetermined or set voltage level, and stops the current from flowing at a voltage lower than the predetermined or set voltage level. Accordingly, the rechargeable battery module 420 including the diode 42 protects the battery cells 41 from over-discharge, and balances the voltage between the battery cells 41.

Figure 4:
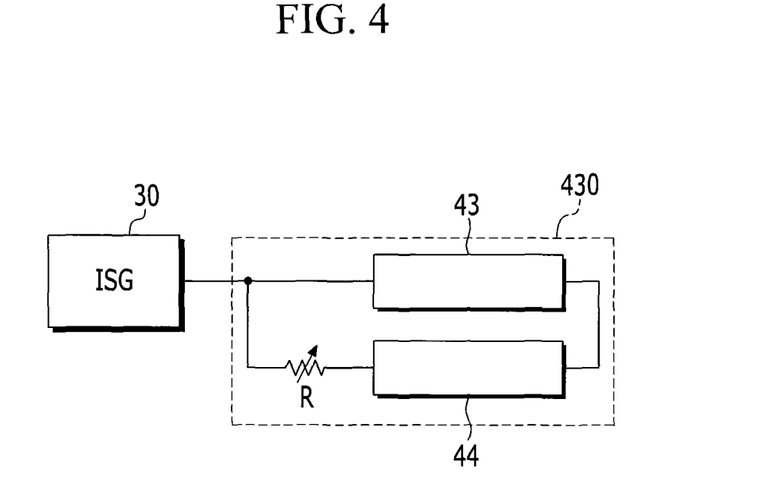
FIG. 4 is a schematic block diagram of a rechargeable lithium battery module according to yet another embodiment.

FIG. 4 is a schematic block diagram of a rechargeable lithium battery module according to yet another embodiment.

Referring to FIG. 4, a rechargeable battery module 430 includes a main rechargeable battery 43 including four battery cells that are connected to each other in series, and an auxiliary rechargeable battery 44 including at least one battery cell connected in parallel to the main rechargeable battery. The auxiliary rechargeable battery 44 may have the same battery cell combination structure as that of the main rechargeable battery 43 or a different battery cell combination structure from that of the main rechargeable battery 43.

The number of the auxiliary rechargeable batteries 44 that are connected in parallel to the main rechargeable battery 43 is not limited to the drawing, and the number of the auxiliary rechargeable batteries 44 may be three or more. The capacity of the rechargeable battery module 430 increases according to the auxiliary rechargeable battery 44.

Meanwhile, the rechargeable battery module 430 may include a fixed resistor or a variable resistor in series with the auxiliary rechargeable battery 44 that controls the discharge amount of the auxiliary rechargeable battery 44. For example, FIG. 4 shows a variable resistor (R). With the fixed resistor or the variable resistor, the rechargeable battery module 430 may have good or improved cycle-life characteristics and safety.

The rechargeable battery modules 410, 420, and 430 illustrated in FIGS. 2 to 4 are only examples, and the structure of the rechargeable battery module is not limited to the structures in the drawings or descriptions and it may be altered in various ways.

The following examples illustrate embodiments of the present invention in more detail. These examples, however, should not in any sense be interpreted as limiting the scope of the present invention.

EXAMPLE 1-1

Fabrication of Rechargeable Lithium Battery Cell
(LCO-soft Carbon)

A positive active material composition was prepared by mixing LiCoO$_2$ as a positive active material, polyvinylidene fluoride (PVDF) as a binder, acetylene black as a conductive material, and activated carbon at an appropriate composition ratio in N-methyl-2-pyrrolidone. A positive electrode was fabricated by applying the positive active material composition to aluminum foil, drying it, and compressing it.

A negative active material composition was prepared by dispersing soft carbon as a negative active material, acetylene black as a conductive material, and polyvinylidene fluoride (PVDF) as a binder at an appropriate composition ratio in N-methyl-2-pyrrolidone solvent. A negative electrode was fabricated by applying the negative active material composition to the upper surface of copper foil, drying it, and compressing it.

As an electrolyte, a mixture was prepared by mixing ethylene carbonate (EC), ethylmethyl carbonate (EMC) and dimethyl carbonate (DMC) at a mixing volume ratio of about 3:3:4 and dissolving about 1.15M of LiPF$_6$ in the mixed solution.

A rechargeable lithium battery cell was fabricated by interposing a polyethylene separator between the fabricated positive electrode and the fabricated negative electrode, injecting the electrolyte, winding the electrodes and separator, and compressing the wound structure.

EXAMPLE 1-2

Fabrication of Rechargeable Lithium Battery Cell
(LFP-soft Carbon)

A rechargeable lithium battery cell was fabricated according to the same method as Example 1-1, except that LiFePO$_4$ was used as the positive active material.

EXAMPLE 1-3

Fabrication of Rechargeable Lithium Battery Cell
(NCM-graphite)

A rechargeable lithium battery cell was fabricated according to the same method as Example 1-1, except that Li[Ni$_{0.5}$Co$_{0.2}$Mn$_{0.3}$]O$_2$ was used as the positive active material and graphite was used as the negative active material.

EXAMPLE 2-1

Fabrication of Rechargeable Lithium Battery Cell
Module

A rechargeable lithium battery cell module was fabricated by connecting four of the rechargeable lithium battery cells fabricated according to Example 1-1 in series.

In this case, the output voltage was about 15.2 V.

EXAMPLE 2-2

Fabrication of Rechargeable Lithium Battery Cell
Module

A rechargeable lithium battery cell module was fabricated by connecting four of the rechargeable lithium battery cells fabricated according to Example 1-2 in series.

In this case, the output voltage was about 13.6 V.

EXAMPLE 2-3

Fabrication of Rechargeable Lithium Battery Cell Module

A rechargeable lithium battery cell module was fabricated by connecting four of the rechargeable lithium battery cells fabricated according to Example 1-3 in series.
In this case, the output voltage was about 14.0 V.

EXAMPLE 3-1

Fabrication of Rechargeable Lithium Battery Cell Module

A rechargeable lithium battery cell module was fabricated by connecting two of the rechargeable lithium battery cells fabricated according to Example 1-1 and two of the rechargeable lithium battery cells fabricated according to Example 1-2 in series.
In this case, the output voltage was about 14.4 V.

EXAMPLE 3-2

Fabrication of Rechargeable Lithium Battery Cell Module

A rechargeable lithium battery cell module was fabricated by connecting two of the rechargeable lithium battery cells fabricated according to Example 1-1 and two of the rechargeable lithium battery cells fabricated according to Example 1-3 in series.
In this case, the output voltage was about 14.6 V.

EXAMPLE 3-3

Fabrication of Rechargeable Lithium Battery Cell Module

A rechargeable lithium battery cell module was fabricated by connecting two rechargeable lithium battery cells fabricated according to Example 1-2 and two rechargeable lithium battery cells fabricated according to Example 1-3 in series.
In this case, the output voltage was about 13.8 V.

EXAMPLE 3-4: Fabrication of rechargeable lithium battery cell module

A rechargeable lithium battery cell module was fabricated by connecting two of the rechargeable lithium battery cells fabricated according to Example 1-1, one rechargeable lithium battery cell fabricated according to Example 1-2, and one rechargeable lithium battery cell fabricated according to Example 1-3 in series.
In this case, the output voltage was about 14.5 V.

EXAMPLE 4-1

Fabrication of Rechargeable Lithium Battery Cell Module

The rechargeable lithium battery cell module was fabricated by disposing a diode at an end of the series of batteries of the rechargeable battery module fabricated according to Example 2-1 in a forward direction of a discharge current.

EXAMPLE 4-2

Fabrication of Rechargeable Lithium Battery Cell Module

The rechargeable lithium battery cell module was fabricated by disposing a diode at an end of the series of batteries of the rechargeable lithium battery module fabricated according to Example 2-2 in a forward direction of a discharge current.

EXAMPLE 4-3

Fabrication of Rechargeable Lithium Battery Cell Module

The rechargeable lithium battery cell module was fabricated by disposing a diode on a line at an end of the series of batteries of the rechargeable lithium battery module fabricated according to Example 3-1 in a forward direction of a discharge current.

EXAMPLE 5-1

Fabrication of Rechargeable Lithium Battery Cell Module

A rechargeable lithium battery cell module was fabricated by using the rechargeable lithium battery cell module fabricated according to Example 2-1 as a main rechargeable battery cell and the rechargeable lithium battery cell module fabricated according to Example 2-1 as an auxiliary battery cell, connecting the auxiliary battery cell to the main rechargeable battery cell in parallel, and disposing a resistor in series with the auxiliary battery cell.

EXAMPLE 5-2

Fabrication of Rechargeable Lithium Battery Cell Module

A rechargeable lithium battery cell module was fabricated by using the rechargeable lithium battery cell module fabricated according to Example 2-1 as a main rechargeable battery cell and the rechargeable lithium battery cell module fabricated according to Example 2-2 as an auxiliary battery cell, connecting the auxiliary battery cell to the main rechargeable battery cell in parallel, and disposing a resistor in series with the auxiliary battery cell.

EXAMPLE 5-3

Fabrication of Rechargeable Lithium Battery Cell Module

A rechargeable lithium battery cell module was fabricated by using the rechargeable lithium battery cell module fabricated according to Example 2-1 as a main rechargeable battery cell and the rechargeable lithium battery cell module fabricated according to Example 3-1 as an auxiliary battery cell, connecting the auxiliary battery cell to the main rechargeable battery cell in parallel, and disposing a resistor in series with the auxiliary battery cell.

The low-temperature discharge characteristics, rapid charge characteristics and cycle-life characteristics of the rechargeable lithium battery cell module according to the above Examples are greatly improved, compared with an AGM-type lead acid battery.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

| Description of Symbols | |
|---|---|
| 1: rechargeable lithium battery | 2: negative electrode |
| 3: positive electrode | 4: separator |
| 5: battery case | 6: sealing member |
| 10: engine | 20: electronic control unit |
| 30: ISG | |
| 40, 410, 420, 430: rechargeable battery module | |
| 41: rechargeable lithium battery cell | 42: diode |
| 43: main rechargeable battery | 44: auxiliary rechargeable battery |

What is claimed is:

1. A rechargeable lithium battery module for an integrated starter and generator (ISG) having a driving voltage range of 13.6 V to 15.6 V, the rechargeable lithium battery module comprising:
   a first rechargeable lithium battery cell comprising:
      a positive electrode comprising a first positive active material; and
      a negative electrode comprising a first negative active material; and
   a second rechargeable lithium battery cell in series with the first rechargeable lithium battery cell, the second rechargeable lithium battery cell comprising:
      a positive electrode comprising at least one of the first positive active material and a second positive active material different from the first positive active material; and
      a negative electrode comprising at least one of the first negative active material and a second negative active material different from the first negative active material,
   wherein the rechargeable lithium battery module is configured to supply power to the ISG and has an output voltage in the ISG driving voltage range of 13.6 V to 15.6 V.

2. The rechargeable lithium battery module of claim 1, wherein the first positive active material and the second positive active material are individually selected from the group consisting of lithium-cobalt-based oxide, lithium-nickel-cobalt-manganese-based oxide, lithium-nickel-cobalt-aluminum-based oxide, lithium-iron-phosphate-based oxide, lithium-manganese-based oxide, lithium-titanium-based oxide, and combinations thereof.

3. The rechargeable lithium battery module of claim 1, wherein the first positive active material and the second positive active material have at least one structure individually selected from the group consisting of a layered structure, a spinel-based structure, and an olivine-based structure.

4. The rechargeable lithium battery module of claim 1, wherein each of the first positive active material and the second positive active material further comprises activated carbon.

5. The rechargeable lithium battery module of claim 1, wherein the first negative active material and the second negative active material comprise at least one carbon-based material individually selected from the group consisting of a crystalline carbon-based material and an amorphous carbon-based material.

6. The rechargeable lithium battery module of claim 5, wherein the carbon-based material is the crystalline carbon-based material, and the crystalline carbon-based material comprises graphite.

7. The rechargeable lithium battery module of claim 5, wherein the carbon-based material is the amorphous carbon-based material, and the amorphous carbon-based material comprises soft carbon.

8. The rechargeable lithium battery module of claim 1, wherein
   the first positive active material comprises at least one material selected from the group consisting of lithium-cobalt-based oxide and lithium iron phosphate-based oxide, and
   the first negative active material comprises soft carbon.

9. The rechargeable lithium battery module of claim 1, wherein the rechargeable lithium battery module comprises four rechargeable lithium battery cells connected in series to form a main rechargeable battery.

10. The rechargeable lithium battery module of claim 9, further comprising:
    a diode electrically connected to an end of the main rechargeable battery.

11. The rechargeable lithium battery module of claim 9, wherein an auxiliary rechargeable battery comprising at least one rechargeable lithium battery cell is connected to the main rechargeable battery in parallel.

12. The rechargeable lithium battery module of claim 11, wherein the auxiliary rechargeable battery has rechargeable lithium battery cells that are the same as the main rechargeable battery.

13. The rechargeable lithium battery module of claim 11, further comprising a resistor electrically connected with the auxiliary rechargeable battery in series.

* * * * *